(12) United States Patent
Dwyer et al.

(10) Patent No.: US 7,219,213 B2
(45) Date of Patent: May 15, 2007

(54) FLAG BITS EVALUATION FOR MULTIPLE VECTOR SIMD CHANNELS EXECUTION

(75) Inventors: Michael K. Dwyer, El Dorado Hills, CA (US); Hong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 11/015,778

(22) Filed: Dec. 17, 2004

(65) Prior Publication Data

US 2006/0149924 A1    Jul. 6, 2006

(51) Int. Cl.
*G06F 15/80* (2006.01)
(52) U.S. Cl. .................. 712/22; 712/5; 712/222; 712/224
(58) Field of Classification Search .................. None
See application file for complete search history.

(56) References Cited

U.S. PATENT DOCUMENTS 5,805,875 A * 9/1998 Asanovic ................ 712/222

2002/0083311 A1* 6/2002 Paver ..................... 712/236
2004/0034760 A1* 2/2004 Paver et al. ............. 712/221
2004/0068642 A1* 4/2004 Tanaka et al. ........... 712/223
2004/0088521 A1* 5/2004 Barlow et al. ............. 712/7

FOREIGN PATENT DOCUMENTS

EP        0 682 309 A2     11/1995
JP        2000047998       2/2000

OTHER PUBLICATIONS

"PCT International Search Report of the International Searching Authority", mailed Oct. 10, 2006, for PCT/US2005/046321, 4pgs.

* cited by examiner

*Primary Examiner*—Kenneth S. Kim
(74) *Attorney, Agent, or Firm*—Buckley, Maschoff, Talwalkar LLC (57) ABSTRACT

According to some embodiments, a evaluation unit may be provided for Single Instruction, Multiple Data (SIMD) execution engine flag registers. For example, a horizontal evaluation unit might perform evaluation operations across multiple vectors being processed by the SIMD execution engine. According to some embodiments, a vertical evaluation unit might perform evaluation operations across multiple flag registers.

15 Claims, 12 Drawing Sheets

FLAG BITS EVALUATION FOR MULTIPLE VECTOR SIMD CHANNELS EXECUTION

BACKGROUND

To improve the performance of a processing system, an instruction may be simultaneously executed for multiple operands of data in a single instruction period. Such an instruction may be referred to as a Single Instruction, Multiple Data (SIMD) instruction. For example, an eight-channel SIMD execution engine might simultaneously execute an instruction for eight 32-bit operands of data, each operand being mapped to a unique compute channel of the SIMD execution engine. Moreover, one or more flag registers may be used, each flag register having locations associated with each channel of the execution engine (e.g., three eight-bit flag registers could be provided for an eight-channel SIMD execution engine). An ability to efficiently and flexibly access flag register information in different ways may improve the performance of the execution engine.

DETAILED DESCRIPTION

Some embodiments described herein are associated with a "processing system." As used herein, the phrase "processing system" may refer to any device that processes data. A processing system may, for example, be associated with a graphics engine that processes graphics data and/or other types of media information. In some cases, the performance of a processing system may be improved with the use of a SIMD execution engine. For example, a SIMD execution engine might simultaneously execute a single floating point SIMD instruction for multiple channels of data (e.g., to accelerate the transformation and/or rendering three-dimensional geometric shapes). Other examples of processing systems include a Central Processing Unit (CPU) and a Digital Signal Processor (DSP).

Figure 1:
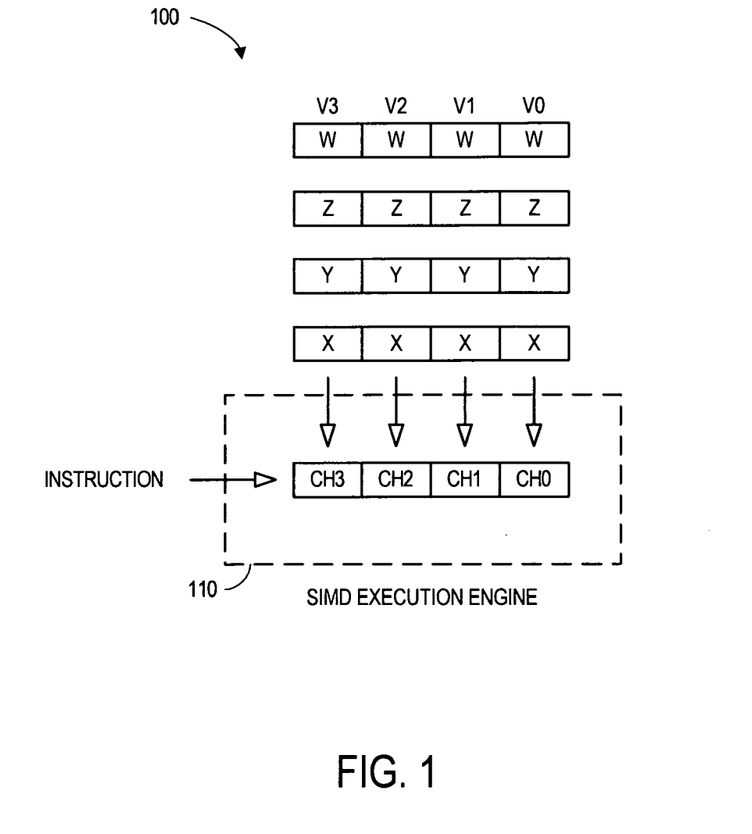
FIGS. 1 and 2 illustrate processing systems.

FIG. 1 illustrates one type of processing system 100 that includes a SIMD execution engine 110. In this case, the execution engine 110 receives an instruction along with four operands of data, where each operand is associated with a different vector (e.g., the four X components from vectors V0 through V3). Each vector may include, for example, three location values (e.g., X, Y, and Z) associated with a three-dimensional graphics location. The engine 110 may then simultaneously execute the instruction for all of the operands in a single instruction period. Such an approach is called a "vertical," "channel-serial," or "Structure Of Arrays (SOA)" implementation.

Figure 2:
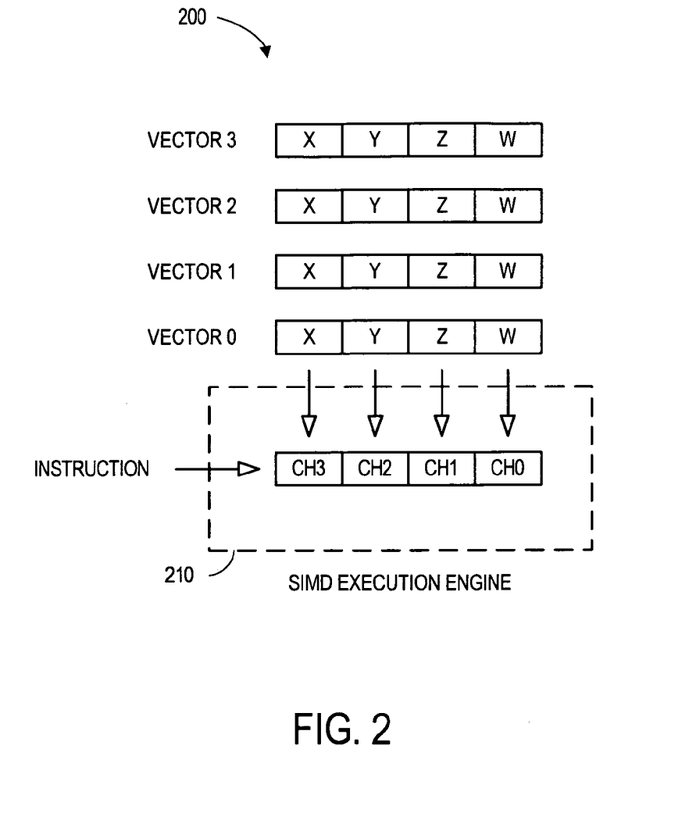

FIG. 2 illustrates another type of processing system 200 that includes a SIMD execution engine 210. In this case, the execution engine 210 receives an instruction (e.g., from an instruction memory unit) along with a four-component data vector (e.g., vector components X, Y, Z, and W, each having bits, laid out for processing on corresponding channels 0 through 3 of the SIMD execution engine 210). The engine 210 may then simultaneously execute the instruction for all of the components in the vector. Such an approach is called a "horizontal," "channel-parallel," or "Array Of Structures (AOS)" implementation. Although some embodiments described herein are associated with a four-channel SIMD execution engine 110, note that a SIMD execution engine could have any number of channels more than one (e.g., embodiments might be associated with a thirty-two channel execution engine).

Figure 3:
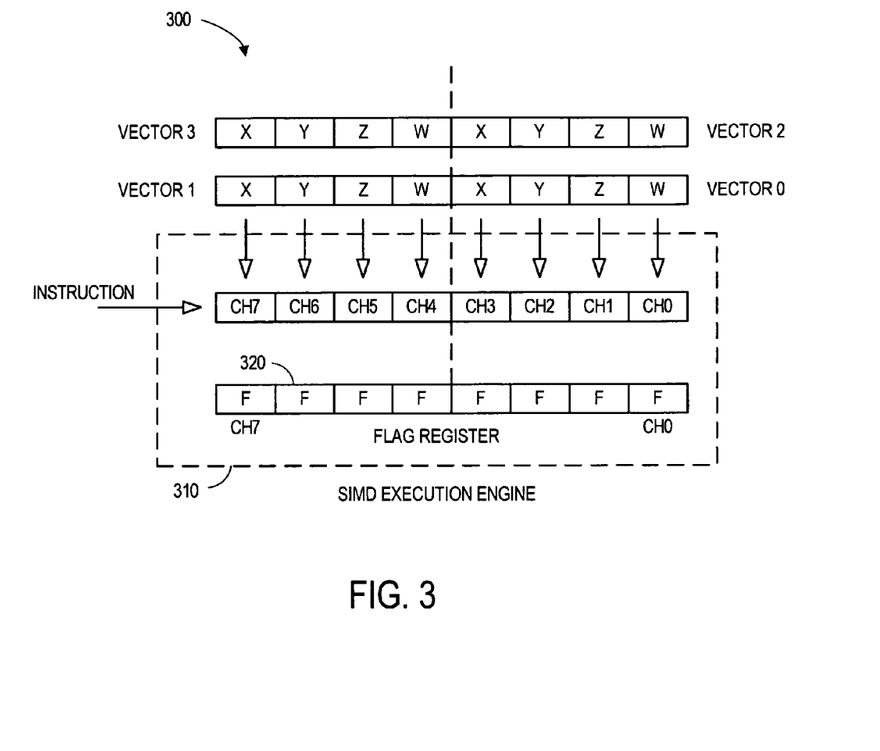
FIG. 3 illustrates a processing system to process two vectors at substantially the same time.

According to some embodiments, a SIMD engine may process information associated with multiple vectors at the same time. For example, FIG. 3 illustrates a processing system 400 including an eight-channel SIMD execution engine 310 that may process two vectors at the same time. That is, channels 0 through 3 might process vector 0 while channels 4 through 7 process vector 1.

The execution engine 310 may further include a flag register 320 having locations associated with each channel. For example, the flag register 320 might be an eight-bit register and each bit may be a Flag (F) associated with one of the logical compute channels. A flag might be associated with, for example, one or more results generated by an Arithmetic-Logic Unit (ALU) operation for that channel. The result might be associated with, for example, a zero, a not zero, an equal to, a not equal to, a greater than, a greater than or equal to, a less than, a less than or equal to, and/or an overflow condition. Consider, for example, the following instruction for a SIMD execution engine:

| add.f.z (8) | r0 | r1 | −r2 |
| --- | --- | --- | --- |

In this case, the value in register r2 is subtracted from the value in register r1, the result is stored in register r0, and a bit in the flag register 320 (".f") will be set if the result equals zero (".z"). This will be performed for all eight channels at the same time, and all eight bits in the flag register 320 will be updated as appropriate.

In some applications, it may be helpful to access information in the flag register 320 in various ways. In a graphics application, for example, it might at some times be helpful to determine if any of flags in the flag register 320 are zero, while at other times it may be helpful to know both if: (i) any of the flags associated with channels 0 through 3 associated with a first vector are zero, and (ii) any of the flags associated with channels 4 through 7 associated with a second vector are zero.

Figure 4:
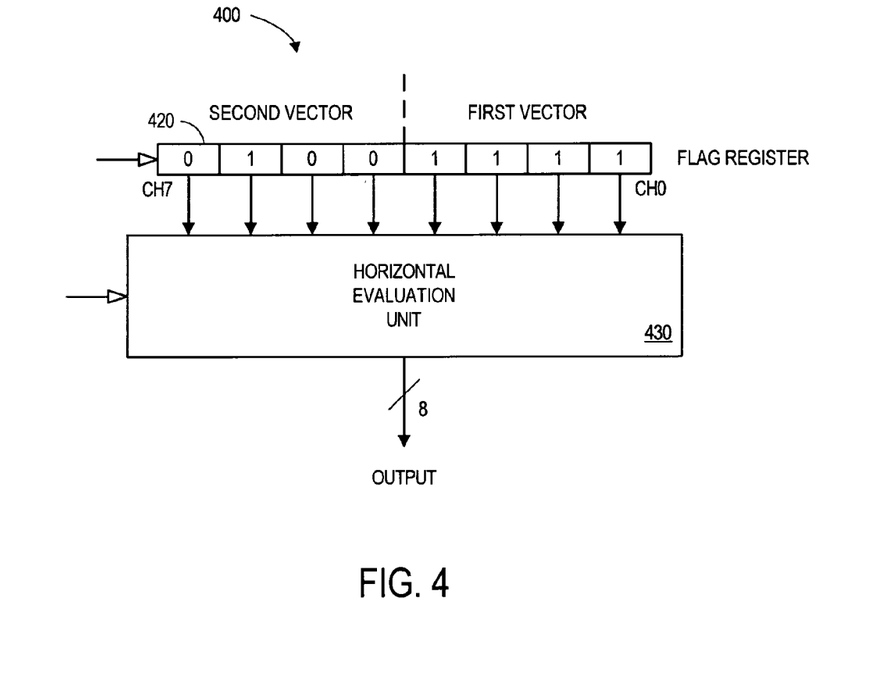
FIG. 4 illustrates a horizontal evaluation unit for a SIMD execution engine flag register according to some embodiments.

FIG. 4 illustrates a system 400 including a flag register 420 according to some embodiments. As before, system 400 may process information associated with multiple vectors at the same time. Although an eight-bit flag register 420 is illustrated in FIG. 4, note that other numbers of bits may be provided. For example, the flag register 420 may be a n-bit flag register of an n-channel SIMD execution engine, where n is an integer greater than one. According to some embodiments, each bit of the flag register 420 may associated with a channel, and the flag register 420 may receive and store information from a SIMD execution unit. According to some embodiments, this information is associated with more than one multiple-channel vector (e.g., two graphics vectors may be processed at the same time).

According to some embodiments, an n-channel execution engine may have a p-bit flag register, where p is less than n. For example, a four-bit flag register might be provided for a sixteen-channel SIMD execution engine, and each bit in the flag register might be associated with four channels.

Moreover, a horizontal "evaluation" unit 430 may be provided to generate an n-bit output, wherein each bit in the output is associated with a channel of the SIMD execution engine. As used herein, the term "evaluation" may refer to an access of information in connection with swizzle, assemble, and/or logical operations. For example, a swizzle operation might be associated with a re-arrangement or grouping of the information. As other examples, information might be replicated, re-arranged, and/or grouped. Moreover, information may be assembled such that portions of separate storage elements are gathered into a single logical storage element. Note that the logical operations that may be performed on the information include logical bit-wise operations, such as AND, OR, and other logic operations.

For example, the horizontal evaluation unit 430 illustrated in FIG. 4 may receive the eight bits from the flag register 420 and generate an eight-bit output. The operation of the horizontal evaluation unit 430 may be controlled, for example, by an operand fetch unit. The horizontal evaluation unit 430 may, according to some embodiments, simply map each flag in the flag register 420 to a corresponding flag in the output (e.g., the output of FIG. 4 would, in this case, be a pass-through of "0100 1111").

According to some embodiments, the horizontal evaluation unit 430 may instead be controlled to perform an evaluation on all of bits in the flag register 420. For example, a "any8" condition might cause the horizontal evaluation unit 430 to determine if any of the eight bits in the flag register are set. If so, all eight bits of the output are set to one. If not, all eight bits of the output are set to zero (e.g., the output of FIG. 4 would be "1111 1111"). Thus, a value of at least one bit in the output may be based on bits in the flag register 420 that represent different execution channels and/or vectors.

According to some embodiments, a horizontal evaluation unit for an n-channel execution engine may have a p-bit output, where p is less than n. For example, a four-bit output might be provided for an eight-channel SIMD execution engine, and each bit in the output might be associated with two channels.

According to some embodiments, the horizontal evaluation unit 430 may be controlled to perform an evaluation on a subset of bits in the flag register 420. For example, the horizontal evaluation unit 430 may be controlled to perform an evaluation on the bits in the flag register 420 associated with CH0, CH2, CH4, and CH6.

Figure 5:
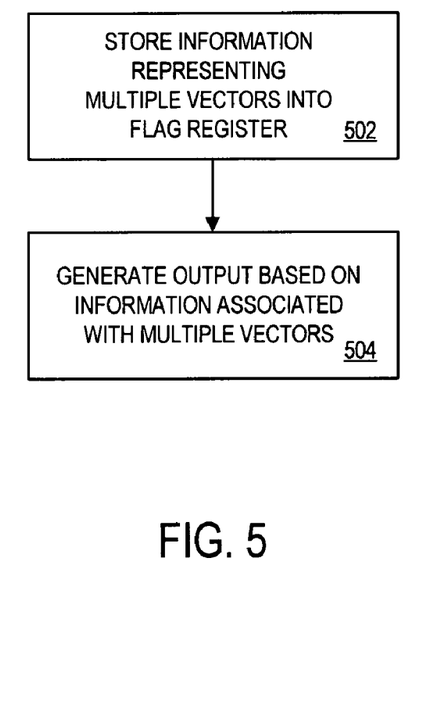
FIG. 5 is a flow chart of a method according to some embodiments.

FIG. 5 is a flow chart of a method according to some embodiments. The method might be performed, for example, in connection with the system 400 of FIG. 4. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 502, information is stored into a n-location flag register of an n-channel SIMD execution engine. The information may represent, for example, multiple m-channel independent vectors, where n and m are integers greater than one.

At 504, an output is generated based on the information in the flag register. The output may include, for example, at least one location whose value is based on information representing different independent vectors. For example, the first bit of an eight-bit output might be set based on information associated with two different vectors that are being processed at the same time.

Figure 6:
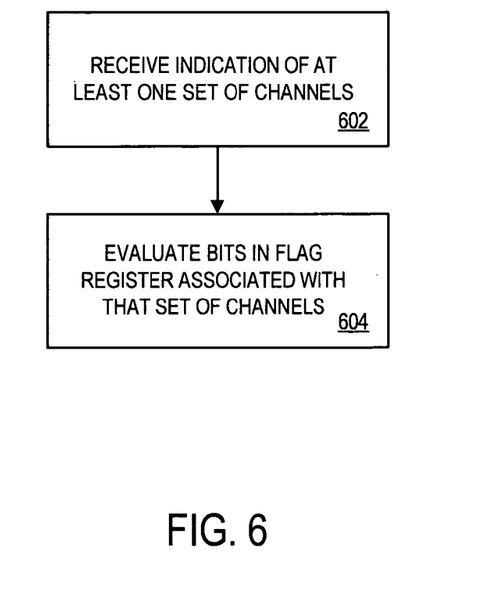
FIG. 6 is a flow chart of a method according to some embodiments.

In some cases, a horizontal evaluation unit may be controlled to operate on different sets of flag register locations. For example, FIG. 6 is a flow chart of a method according to some embodiments. At 602, an indication associated with at least one set of SIMD execution engine channels is received. At 604, bits associated with that set of channels are evaluated The horizontal evaluation unit may, for example, receive an indication of a "all4" condition. Referring again to FIG. 4, such a condition may cause the horizontal evaluation unit 430 to separately evaluate if all flag bits are one for both: (i) the bits in the flag register that correspond to channels 0 through 3 and (ii) the bits in the flag register that correspond to channels 4 through 7.

A result of each evaluation may then be stored in the set of bits in the output that represent the set of SIMD execution engine channels. For example, if all of the bits in the flag register 420 that correspond to channels 0 through 3 are set, the bits in the output that correspond to channels 0 to 3 may be set. Similarly, if all of the bits in the flag register 420 that correspond to channels 4 through 7 are set, the bits in the output that correspond to channels 4 to 7 may be set. In the case illustrated in FIG. 4, the output would be "0000 1111."

The indications received by the horizontal evaluation unit 430 might be associated with different sized sets of SIMD execution engine channels. For example, as previously described, the sets evaluated by the horizontal evaluation unit 430 might be associated with one eight-bit set or two four-bit sets. As another example, the horizontal evaluation unit 430 might receive an indication associated with an "any2" condition meaning that four pairs of flags should be evaluated (and the result of each evaluation is to be mapped to the corresponding two bits in the output). In the case illustrated in FIG. 4, the output would be "1100 1111."

Note that any size sets, or combinations of size sets, might be provided (and that the bits in the set do not need to be neighbors). Consider, for example, a sixteen-bit flag register. In this case, eight two-bit sets might be evaluated. As another example, the two Most Significant Bits (MSBs) and the two Least Significant Bits (LSBs) may be combined and evaluated as a first set while the remaining twelve bits are evaluated as a second set.

These types of evaluation operations "horizontally" may group, re-arrange, and/or evaluate information across a single flag register 420. Refer now to the system 700 of FIG. 7, which includes two eight-bit flag registers 720 (f0 and f1).

Figure 7:
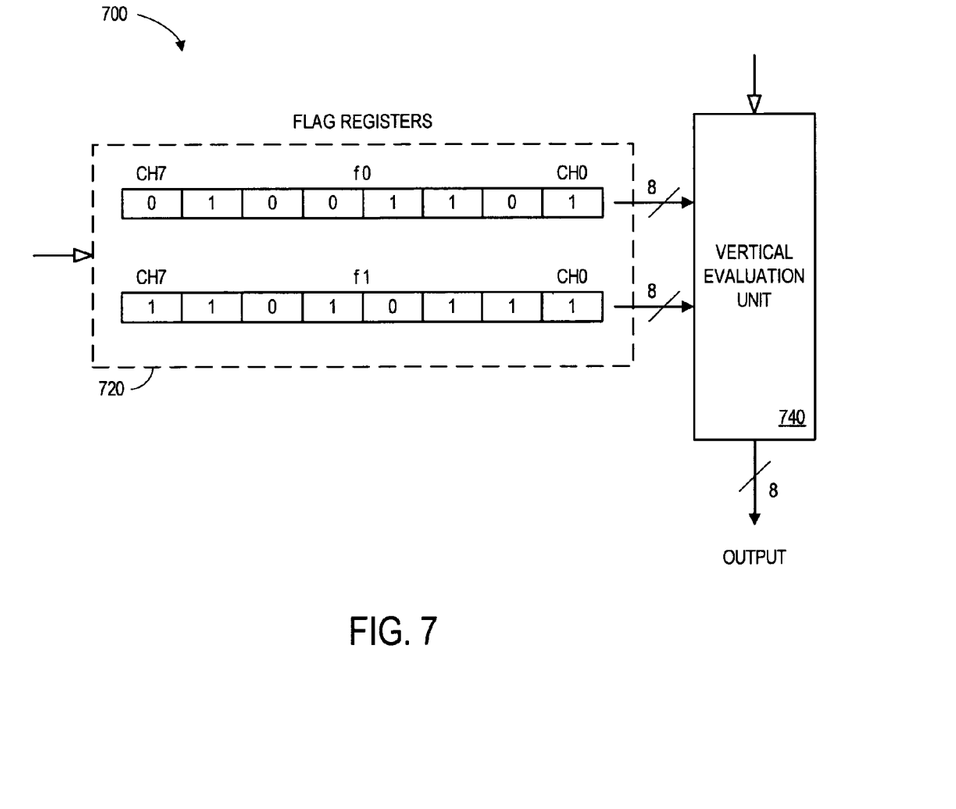
FIG. 7 illustrates a vertical evaluation unit for SIMD execution engine flag registers according to some embodiments.

Although two flag registers 720 are illustrated in FIG. 7, more than two may be provided.

Consider now, for example, the following instructions for a SIMD execution engine:

| | | | |
|---|---|---|---|
| add.f0.z (8) | r0 | r1 | −r2 |
| add.f1.z (8) | r3 | r4 | r5 |

In this case, the value in register r2 is subtracted from the value in register r1, the result is stored in register r0, and a bit in flag register 0 ("f0") will be set if the result equals zero (".z"). Note that this instruction may be performed on eight operands of data at the same time (and all eight bits in f0 may be updated at the same time). Similarly, the value in register r5 is added to the value in register r4, the result is stored in register r3, and a bit in flag register 1 (".f1") will be set if the result equals zero (".z").

According to some embodiments, a vertical evaluation unit 740 may be provided to generate an n-bit output, the output including at least one bit whose value is based on information from both flag registers 720. For example, the vertical evaluation unit 740 may receive the eight bits of f0 along with the eight bits of f1 and generate an 8-bit output.

Figure 8:
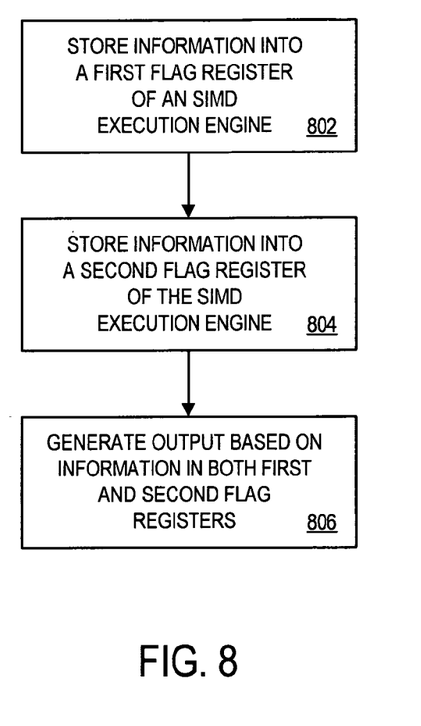
FIG. 8 is a flow chart of a method according to some embodiments.

FIG. 8 is a flow chart of a method according to some embodiments. The method may be associated with, for example, the system 700 of FIG. 7. At 802, information is stored into a first n-location flag register of an n-channel SIMD execution engine, wherein n is an integer greater than one. Similarly, information is stored into a second n-location flag register of the execution engine at 804. At 806, an output is generated, the output including at least one location whose value is based on information from both the first flag register and the second flag register.

Referring again to FIG. 7, the vertical evaluation unit 740 might be controlled to pass the values of f0 (or f1) through as an output. In this case, the output illustrated in FIG. 7 would be "0100 1101" in the case of f0 (or "1101 0111" in the case of f1). According to some embodiments, the vertical evaluation unit 740 might combine information from both f0 and f1 to generate the output. For example, the vertical evaluation unit 740 might receive an indication associated with an "all2" condition such that a bit in the output should be set only if the corresponding bit in both f0 and f1 are set (e.g., the output of FIG. 7 would be "0100 0101"). Similarly, an "any2" condition might result in an output of "1101 1111" for FIG. 7.

The "vertical" evaluation unit 740 may thus combine information across the different flag registers 740. In some cases, to the vertical evaluation unit 940 might combine information across sets of flag registers. Consider, for example, the system 900 of FIG. 9 which includes four eight-bit flag registers 920 (f0 through f3). Moreover, the vertical evaluation unit 940 receives eight bits from each of the flag registers and generates an 8-bit output.

Figure 9:
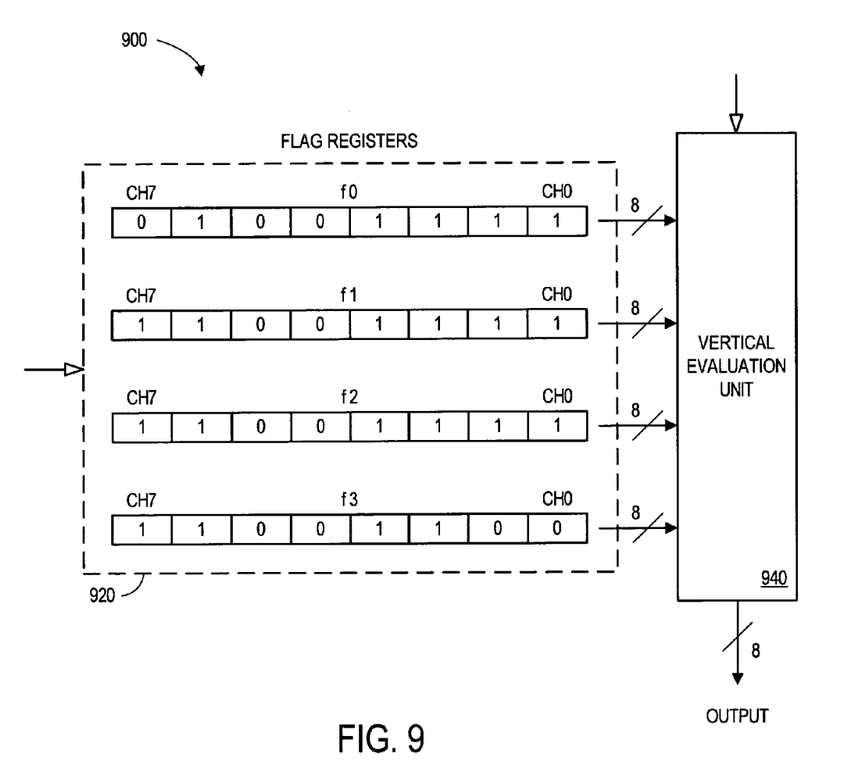
FIG. 9 illustrates a vertical evaluation unit for SIMD execution engine flag registers according to some embodiments.
Figure 10:
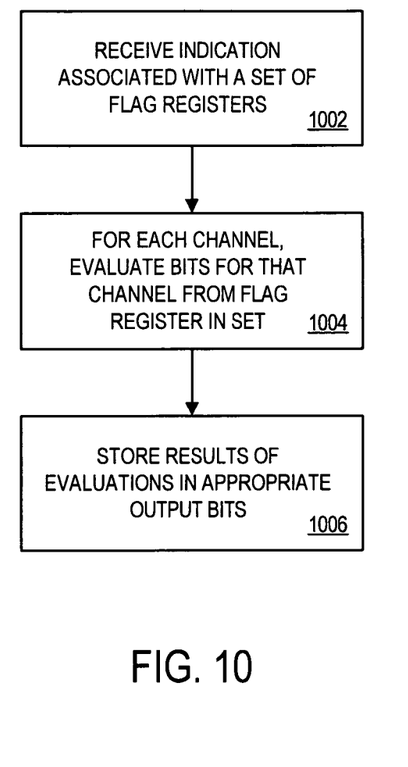
FIG. 10 is a flow chart of a method according to some embodiments.

FIG. 10 illustrates a method that may be associated with such a system 900. At 902, an indication associated with a set of the flag registers is received. The indication might control the vertical evaluation unit 940 to, for example, operate on one of the flag registers or all four of the flag registers.

According to some embodiments, the vertical evaluation unit 940 might be controlled to operate on other sets of flag registers. For example, the vertical evaluation unit 940 might be controlled to evaluate f0 and f1 (and to ignore f2 and f3). As another example, the vertical evaluation unit 940 might be controlled to operate on f0, f2, and f3 (and to ignore f4).

For each SIMD execution engine channel, the bits that represent that channel from the flag registers in the set are evaluated at 1004. The result of these evaluations are stored in appropriate output bits at 1006.

Referring again to FIG. 9, assume the vertical evaluation unit 940 has received an indication that f0 and f1 should be evaluated and that each output bit should be set if and only if the corresponding bit in both of those two flag registers are set to one. In the example of FIG. 9, the output would then be "0100 1111." If the vertical evaluation unit 940 had instead been controlled to evaluate f2 and f3, the output would have been "1100 1100."

According to some embodiments, horizontal and vertical evaluation operations may be supported. Consider, for example, the system 1100 of FIG. 11 which includes four eight-bit flag registers 1120 (f0 through f3). According to some embodiments, a multiplexer 1150 determines if eight bits of data or eight result bits (e.g., each bit representing one or more ALU flags) are stored into a flag register 1120. Moreover, a back end of a SIMD execution unit might, for example, use a FlagWrite, FlagSelect command to select which of f0 through f3 will store the information.

Figure 11:
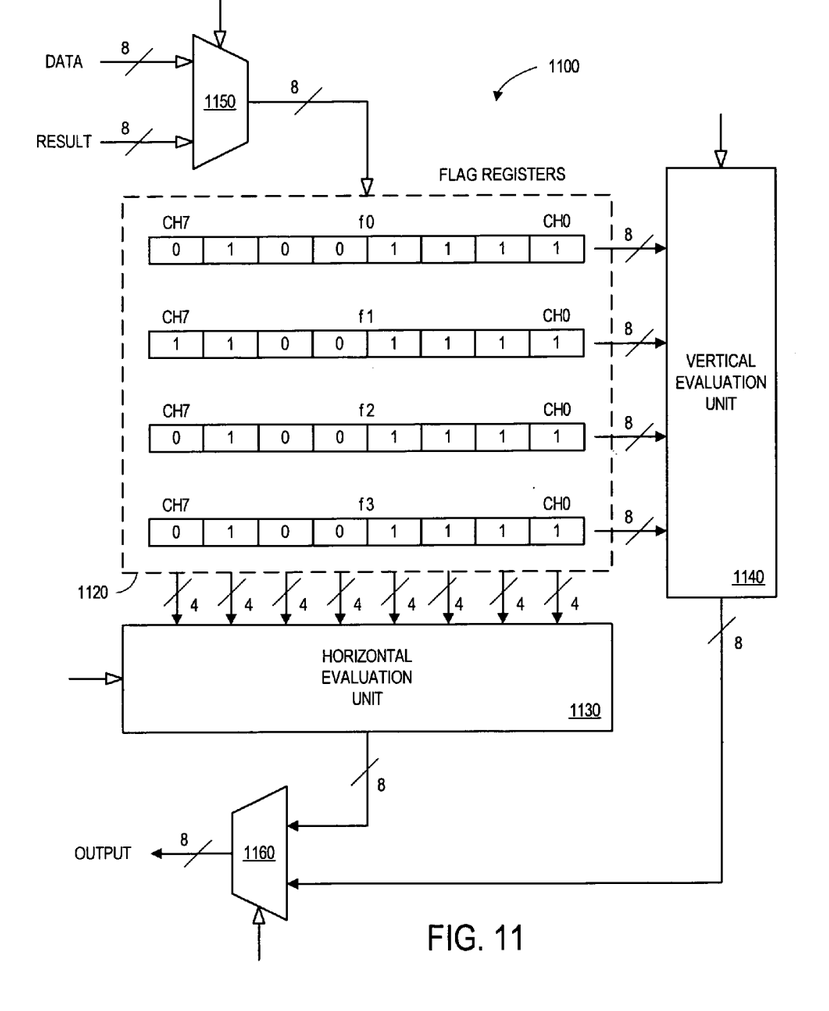
FIG. 11 illustrates horizontal and vertical evaluation units for SIMD execution engine flag registers according to some embodiments.

According to some embodiments, a horizontal evaluation unit 1130 receives four bits (one from each flag register) for each SIMD execution channel and generates an eight-bit output. A vertical evaluation unit 1140 receives eight bits (for each SIMD execution channel) from each flag register and generates an eight bit output. The horizontal evaluation unit 1130 and the vertical evaluation unit 1140 may operate in accordance with any of the embodiments described herein and may be controlled, for example, by a front end of a SIMD execution unit.

A multiplexer 1160 may determine whether an execution unit front end receives the output of the horizontal evaluation unit 1130 or the output of the vertical evaluation unit 1140. For example, one instruction might cause the system 1100 to perform a horizontal evaluation on the flag registers (e.g., "any2horizontal for f2" causing pairs of bits in f2 to be evaluated) while another instruction results a vertical evaluation (e.g., "all4vertical" causing four bits to be evaluated for each channel).

Because information in the flag registers 1120 may be efficiently and flexibly accessed in different ways, the performance of the system 1100 may be improved. For example, the cross-channel distribution and logical combination of flag bits may reduce the amount instructions that would otherwise be needed to perform such a flag evaluation via software.

Moreover, consider an execution engine that supports both 8-channel and 16-channel operation. According to some embodiments, horizontal evaluation operations may facilitate the use of all flag register bits when 8-channel operation is enabled (e.g., two eight-channel sets of flag register bits may be used for horizontal evaluation operations). In addition, SOA and AOS programming may be supported.

Figure 12:
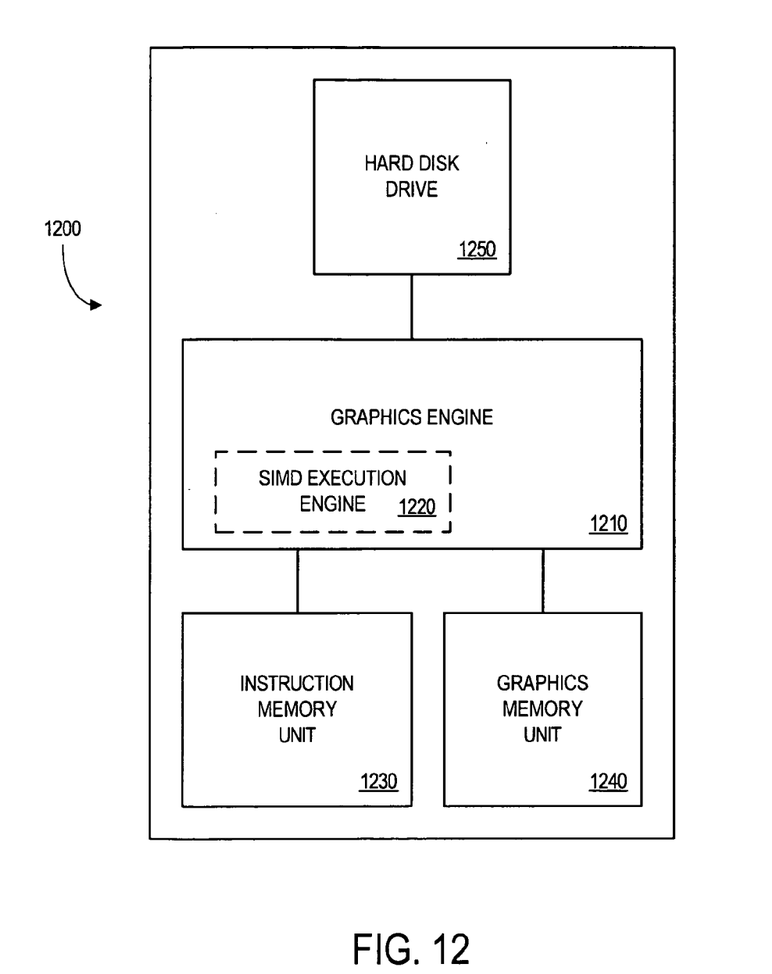
FIG. 12 is a block diagram of a system according to some embodiments.

FIG. 12 is a block diagram of a system 1200 according to some embodiments. The system 1200 might be associated with, for example, a media processor adapted to record and/or display digital television signals. The system 1200 includes a graphics engine 1210 that has an n-operand SIMD execution engine 1220 in accordance with any of the embodiments described herein. For example, the SIMD execution engine 1220 might have horizontal and/or vertical evaluation units for one or more flag registers. The system 1200 may also include an instruction memory unit 1230 to store SIMD instructions and a graphics memory unit 1240 to store graphics data (e.g., vectors associated with a three-dimensional image). The instruction memory unit 1230 and the graphics memory unit 1240 may comprise, for example, Random Access Memory (RAM) units. According to some embodiments, the system 1200 also includes a hard disk drive 1250 (e.g., to store and provide media information).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although certain evaluation operations have been described herein as examples, embodiments may re-arrange and/or re-organize flag register information in any number of ways. For example, a horizontal evaluation unit might swap the sixteen LSBs of a thirty-two bit flag register with the sixteen MSBs. Similarly, some bits in the flag register may be replicated in other bits (e.g., the flag bit associated with a graphics vector X-component might be replicated for the flag bits associated with the other three components of that vector).

As another example, consider a case wherein it would be helpful to determine if none of following bits are set: (i) those in f2 associated with SIMD execution channels 0 through 3 and (ii) those in f0 associated with SIMD execution channels 4 through 7. In this case, a horizontal evaluation unit might receive the bits of all four flag registers for each execution channel and generated an assembled eight bit set of information before performing the appropriate evaluation to generate an output.

As still another example, a system might process a first graphics vector using channels 0 through 3 and a second graphics vector using channels 4 through 7. In addition, assume it would be helpful to determine, on a per-channel basis, when both of the following are true: (i) the bit in f0 and the bit in f1 are zero for the second graphics vector and (ii) the bit in f2 and the bit in f3 are zero for the first graphics vector. In this case, an evaluation unit might swap the lower four bits of the f2 with the upper four bits of f2 (and perform a similar operation for f3) before performing a vertical evaluation operation.

In addition, note that embodiments described herein might support a multi-threaded SIMD execution engine. Consider, for example, a sixteen-channel SIMD with four flag registers that can execute three threads. In this case, a horizontal evaluation unit might receive three sets of four bits (three threads of the four flag registers) for each of the sixteen execution channels. Similarly, a vertical evaluation unit might receive three sets of sixteen bits (three threads of sixteen channels) for each of the four flag registers.

The several embodiments described herein are solely for the purpose of illustration. Persons skilled in the art will recognize from this description other embodiments may be practiced with modifications and alterations limited only by the claims.

What is claimed is:

1. A method, comprising:
storing information into a n-location flag register of an n-channel Single Instruction, Multiple-Data (SIMD) execution engine, the information being generated by execution of a single instruction on multiple m-channel independent vectors, where n and m are integers greater than one, wherein each vector comprises at least three values associated with a three-dimensional graphics position;
receiving an indication representing at least one set of SIMD execution engine channels;
evaluating the set of bits in the flag register that represent the indicated set of SIMD execution engine channels, wherein the set of bits includes bits associated with at least two different independent vectors; and
generating an output based on the evaluating.

2. The method of claim 1, wherein the flag register has p bits, each bit representing at least one channel of the SIMD execution engine and p being less than n.

3. The method of claim 1, wherein the output has p bits, each bit representing at least one channel of the SIMD execution engine and p being less than n.

4. The method of claim 1, wherein said storing comprises storing first information into a first flag register, and further comprising:
storing second information into a second flag register of the SIMD execution engine;
receiving a second indication representing a second set of SIMD execution engine channels, wherein the second set of SIMD execution engine channels are different than the indicated set of SIMD execution engine channels;
evaluating the set of bits in the flag register that represent the second set of SIMD execution engine channels; and
generating a second output, the second output including at least one location whose value results from different independent vectors.

5. The method of claim 1, wherein (i) the flag register has n bits, each bit representing a channel of the SIMD execution engine, and (ii) the output has n bits, each bit representing a channel of the SIMD execution engine.

6. The method of claim 5, wherein a first bit in the output represents a first channel of the SIMD execution engine, and the value of the first bit in the output is based at least in part on a bit in the flag register that does not represent the first channel.

7. The method of claim 1, wherein the received indication is associated with multiple sets, and said evaluating and storing are performed for each set.

8. The method of claim 1, wherein said evaluating comprises determining if one of: (i) all of the set of bits in the flag register have a first value, or (ii) any of the set of bits in the flag register have a first value.

9. The method of claim 1, wherein indications may be associated with different sized sets of SIMD execution engine channels.

10. An apparatus, comprising:
a n-bit flag register of an n-channel Single Instruction, Multiple-Data (SIMD) execution engine, where n is an integer greater than one and each bit of the flag register is associated with a channel, and wherein the flag register is to store information from an execution unit, the information being generated by execution of a single instruction on multiple m-channel independent vectors, where m is an integer greater than one, wherein each vector comprises at least three values associated with a three-dimensional graphics location; and
a horizontal evaluation unit to receive an indication representing at least one set of SIMD execution engine channels, evaluate a set of bits in the flag register that represent the indicated set of SIMD execution engine channels wherein the set of bits includes bits associated with at least two different independent vectors, and generate an output based on the evaluating.

11. The apparatus of claim 10, wherein indications may be associated with different sized sets of SIMD execution engine channels.

12. An apparatus, comprising:
a n-bit flag register of an n-channel Single Instruction, Multiple-Data (SIMD) execution engine, where n is an integer greater than one and each bit of the flag register is associated with a channel, and wherein the flag register is to store information from an execution unit, the information being generated by execution of a single instruction on multiple m-channel independent vectors, where m is an integer greater than one, wherein each vector comprises at least three values associated with a three-dimensional graphics location; and
a vertical evaluation unit to receive an indication representing at least one set of flags in the flag register, evaluate a set of bits in the flag register that represent the indicated set of flags in the flag register wherein the set of bits includes bits associated with at least two different independent vectors, and generate an output based on the evaluating.

13. The apparatus of claim 12, further comprising:
an execution unit to provide the indication and receive the output.

14. A system, comprising:
a processor, including:
an n-channel Single Instruction, Multiple-Data (SIMD) execution engine, wherein n is an integer greater than one, including:
a first n-bit flag register,
a second n-bit flag register, wherein each flag register contains information generated by execution of a single instruction on multiple m-channel independent vectors, where n and m are integers greater than one, wherein each vector comprises at least three values associated with a three-dimensional graphics location, and
a vertical evaluation unit to receive an indication representing at least one set of flags in the flag register, evaluate a set of bits in the flag register that represent the indicated set of flags in the flag register, and generate an output, wherein the set of bits includes bits associated with at least two different independent vectors; and
a graphics memory unit.

15. The system of claim 14, further comprising:
a horizontal evaluation unit.

* * * * *